United States Patent [19]
Jensen et al.

[11] Patent Number: 4,880,269
[45] Date of Patent: Nov. 14, 1989

[54] VEHICLE CAB WINDOWS

[75] Inventors: Svend Jensen, Randers, Denmark; David S. Paul, Windgather; Michael Appleyard, Chorley, both of England

[73] Assignee: Massey-Ferguson Services N.V., Curacao, Netherlands Antilles

[21] Appl. No.: 215,120

[22] Filed: Jul. 5, 1988

[30] Foreign Application Priority Data

Jul. 7, 1987 [GB] United Kingdom ............... 8715976

[51] Int. Cl.$^4$ ............................................. B62D 33/06
[52] U.S. Cl. ..................................... 296/190; 49/246; 49/248; 49/255
[58] Field of Search ................... 296/190, 146, 201; 49/246, 248, 255

[56] References Cited

U.S. PATENT DOCUMENTS

| | | | |
|---|---|---|---|
| 2,919,155 | 12/1959 | Williams et al. | 49/248 |
| 3,410,599 | 11/1968 | Kettler | 296/190 |
| 3,722,142 | 3/1973 | Anderberg et al. | 49/248 |
| 4,518,195 | 5/1985 | Tindall et al. | 296/190 |

Primary Examiner—Robert R. Song
Attorney, Agent, or Firm—Robert L. Farris

[57] ABSTRACT

A vehicle cab 10 with a window aperture 11 closed by a pivotable glazing panel 12. The window aperture is of a vertically tapering form such that the width 'W' of the lower regions of the aperture is less than higher regions of the aperture and the glazing panel 12 is of a similar vertically tapering form. A glazing panel mounting structure 13 allows the glazing panel to be moved from a generally upright closed position to a generally horizontal open position 12' by raising the panel in a vertical sense so that the lower narrower portion of the panel is in alignment with a wider higher portion of the aperture and then pivoting the lower narrower portion of the glazing panel about a first generally horizontal axis 21 through the wider higher portion of the aperture to its generally horizontal open position. The locus 60 of the glazing panel as it moves between its closed and open positions may be controlled to a predetermined pattern by a linkage 42, 49, 50, 51, 52 which inter-connects the movements of the mounting structure and glazing panel relative to the cab.

9 Claims, 4 Drawing Sheets

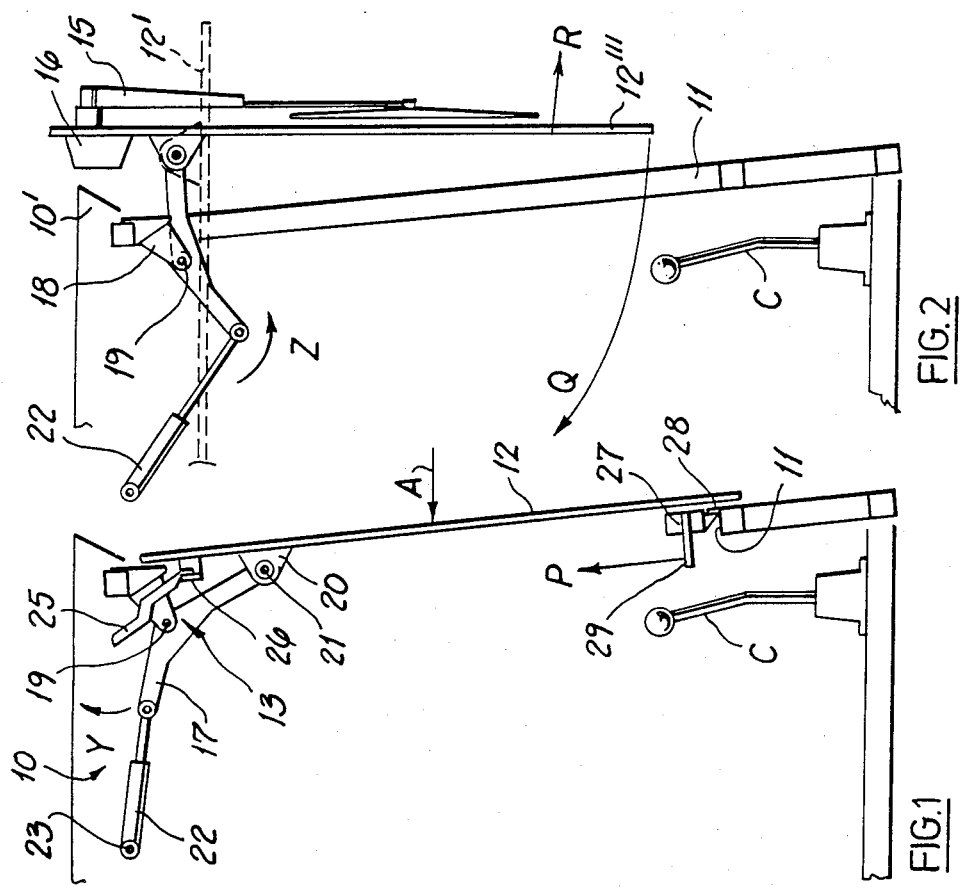

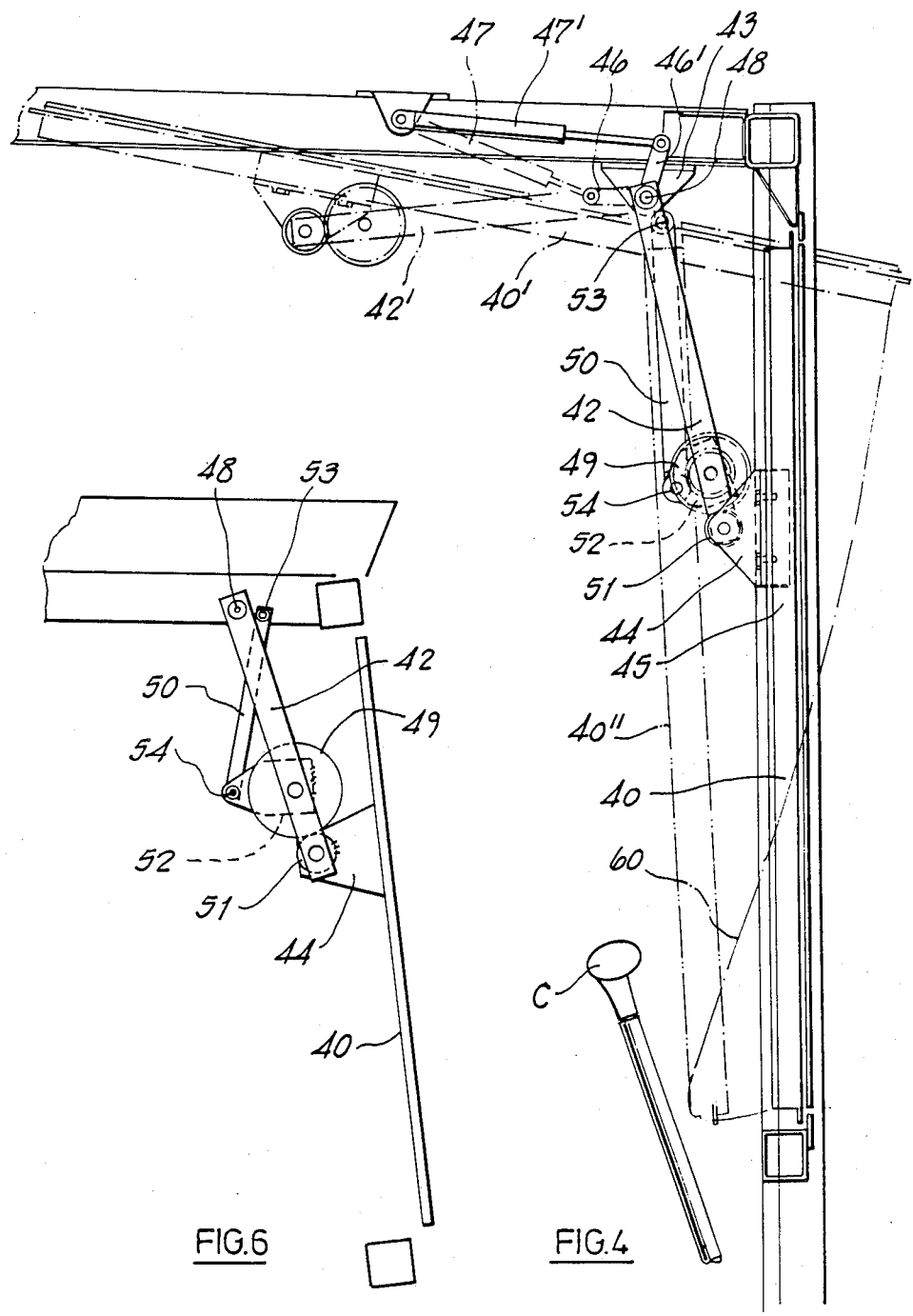

VEHICLE CAB WINDOWS

This invention relates to vehicle cabs and in particular to providing a vehicle cab with an opening rear window assembly.

There is long outstanding requirement to provide a simple and efficient window assembly which is suitable for use as an opening rear window in a tractor cab which gives a clear and uninterrupted view to the rear of the cab when the window is closed and which can easily be moved between its open and closed positions by the tractor operator without intruding excessively into the operator's space within the cab, or fouling any equipment (such as a digger) carried on the rear of the tractor, or fouling the hand controls for such equipment.

It is an object of the present invention to provide a vehicle cab with a window assembly which is capable of meeting the above requirements.

Thus according to the present invention there is provided a vehicle cab having a window aperture closed by a pivotable glazing panel, the window aperture being of vertically tapering form such that the width of the lower regions of the aperture is less than higher regions of the aperture and the glazing panel is of similar vertically tapering form, and glazing panel mounting means which allows the glazing panel to be moved from a generally upright closed position to a generally horizontal open position by raising said panel in a vertical sense so that the lower narrower portion of the panel is in alignment with a wider higher portion of the aperture and then pivoting the lower narrower portion of the glazing panel about a first generally horizontal axis through the wider higher portion of the aperture into its generally horizontal open position.

Using the above arrangement it is possible, for example, for the glazing panel to be of similar tapering form to the aperture but to be larger in dimension so that the glazing panel when in its closed position can seal onto the outside of the cab around the aperture. When being pivotted towards its open position, the glazing panel may be pivotted inside the cab after having been vertically raised so that the lower, narrower portion of the panel is in alignment with a wider, higher portion of the aperture.

In such an arrangement, the glazing panel may carry a perimeter seal which contacts the cab or alternatively the seal may be mounted on the cab for contact by the glazing panel.

Preferably a portion of the glazing panel is arranged to project outside the cab when the panel is in its open position to provide a canopy to protect the vehicle operator from rain or other bad weather.

The glazing panel mounting means may include a support arm structure which is pivotally mounted on the cab about a second generally horizontal axis the glazing panel being pivotally mounted on the arm about said firt axis. Spring means, for example a gas-filled strut, may be provided which act on the support arm in an over-centre manner about said second axis to bias the panel towards both its closed and open positions.

In one form of the invention a mechanism is provided for interlinking the pivotal movement of the support arm structure and glazing panel to ensure that a predetermined angular relationship is maintained between the cab and the support arm structure and between the support arm structure and the glazing panel as the panel is pivoted between its closed and open positions so that the glazing panel moves between its closed and open positions along a path which does not significantly encroach into the operator's space envelope within the cab.

Preferably the mechanism comprises a first gear wheel interconnected with the cab so that pivotting of the support arm structure rotates said first gear wheel and a second gear wheel which engages said first gear wheel and is connected with the glazing panel to pivot the glazing panel relative to the support arm as the support arm pivots relative to the cab.

By appropriate choice of the gear ratio between the first and second gear wheels, the locus of the glazing panel during movement between its closed and open positions can be set to the desired form.

Preferably the inter-connection between the first gear wheel and cab is provided by a control arm which is mounted at the end on the cab and connected at the other end with the first gear wheel via a lever so that the cab, support arm structure, control arm and lever form a four-bar linkage, with the control arm pivotting with the support arm structure to rotate the first gear wheel.

In a futher form of the invention, the glazing panel is in upper and lower parts which are hinged together by a horizontally extending hinge which constitutes said first pivot axis, the lower part of the panel being of vertically tapering form and the mounting means mounting an upper edge portion of th upper part of the panel on the cab for pivoting about a second generally horizontal axis, thus allowing the lower part of the panel to be vertically raised by pivotting the upper part of the panel upwards and outwards relative to the cab about said second axis and the lower part of the panel to be subsequently pivotted upwards and inwards relative to the upper panel part to pass through the window aperture towards its generally horizontal open position. In such an arrangement, the depth of the upper part of the panel determines the extent to which the panel projects from the cab to provide a protective canopy when in its open position.

Various embodiments of the present invention, as applied to the rear window of a tractor cab, will now be described, by way of example only, with reference to the accompanying drawings in which:

FIGS. 1 and 2 show part-sectional side views of a first form of the invention in the closed and partly open positions respectively;

FIG. 3 is a half end view in the direction of arrow A of FIG. 1;

FIGS. 4 and 5 are part-sectional side and half end views respectively of a second form of the invention in which a mechanism is provided for controlling the path of the glazing panel as it is moved between its closed and open positions;

FIG. 6 is a diagrammatic representation of the glazing panel path control mechanism shown in FIG. 4, and FIGS. 7 and 8 are part-section side and end views respectively of a further form of the invention utilising a two-piece folding glazing panel.

Figure 5:
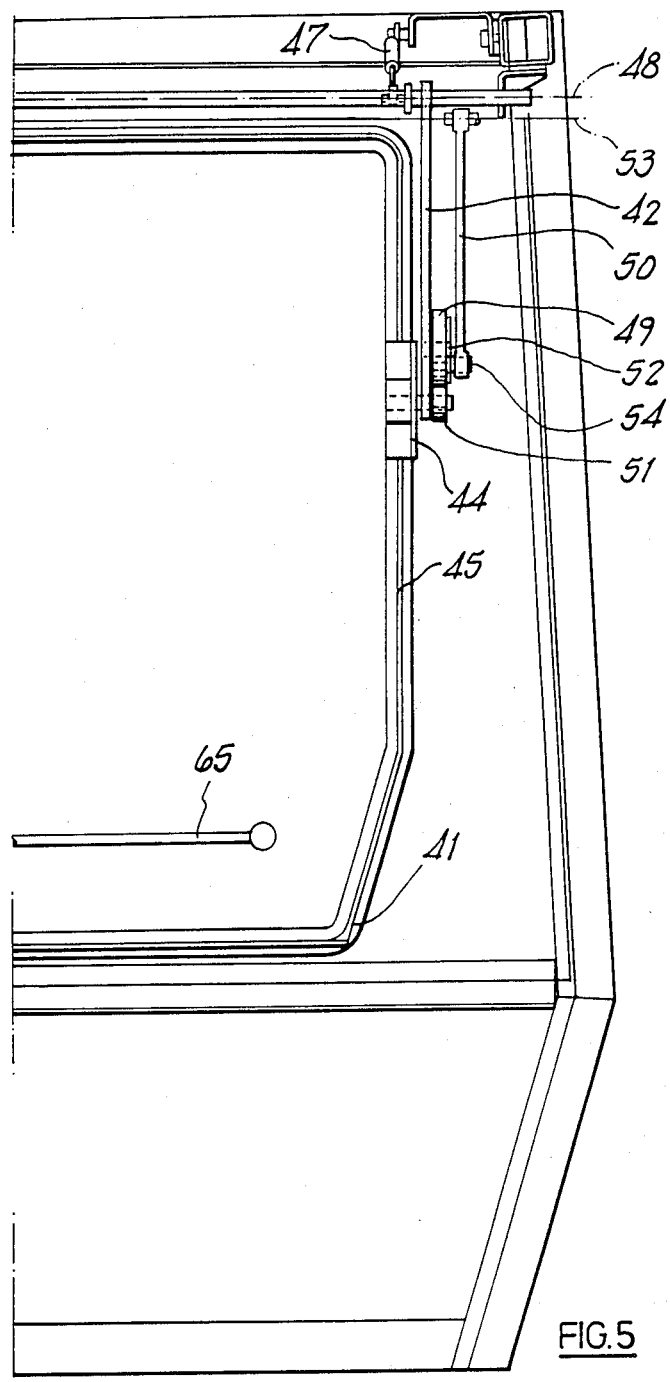

Referring to FIGS. 1 to 3, a tractor cab 10 is provided with a rear window aperture 11 of vertically tapering form. As can be seen from FIG. 3, the width W of the lower regions of the aperture is less than the higher regions of the aperture. A glazing panel 12 is pivotally mounted on the cab by a mounting means 13 for movement between a generally upright closed position shown in FIG. 1 and a generally horizontal open position shown by dotted detail 12' in FIG. 2. The glazing panel is of similar vertically tapering form to the aperture 11, but of slightly larger dimentions so that when in its closed position it overlaps the edge of aperture 11 as shown by dotted detail 12'' in FIG. 3. The glazing panel may carry a peripherall seal which contacts the cab, or alternatively the seal may be mounted on the cab for contact by the glazing panel in order to seal the panel to the cab when in its closed position.

Also mounted on the glazing panel 12 is a rear window wiper 15 and an associated wiper motor 16 protected by a plastics cover.

The rear window mounting means 13 comprises a pair of support arms 17 (only one of which is shown in FIGS. 1 to 3), these arms being positioned one at each sie of the glazing panel. Each arm is mounted on the cab by a bracket 18 for pivoting about an axis 19. The glazing panel is mounted on one end of each arm via a bracket 20 for pivotting of the glazing panel about an axis 21. The other end of each support arm is connected with a gas strut 22 which is mounted on the cab for pivotting about an axis 23. The gas strut is mounted to function in an over-centre manner about axis 19, so that when the glazing panel is in the closed position shown in FIG. 1 it applies a clockwise movement Y to the support arm 17 but will apply an anticlockwise movement Z to the support arm when the glazing panel is being moved towards its open position.

Latches are also provided to secure the glazing panel in its closed position. Any convenient form of latch may be adopted for this purpose. For example, a pivotting latch member 25 may be mounted on the cab for engagement with a keeper 26 mounted adjacent to the upper edge of the glazing panel. One or more spring-loaded latches 27 may be provided adjacent the lower edge of the glazing panel for engagement with co-operating keepers 28 on the cab. A handle 29 is provided for opening the window. This handle may conveniently be of the bar type extending across the window adjacent the lower edge thereof and may be arranged also to serve as the operating member for the latch or latches 27 at the lower edge of the glazing panel.

In order to open the glazing panel, the tractor operator first releases the latches 25 and 27 from their associated keepers 26 and 28 and then pulls upwardly on the handle 29 as indicated by the arrow P. This causes the gas struts 22 to move over-centre relative to axis 19 so that they now apply a counter clockwise turning moment Z to the support arms 17. The support arms are thus pivoted about axis 19 to the position shown in FIG. 2, where they abut the brackets 18. This counter clockwise rotation of the support arms 17 also raises the glazing panel to the position 12''' of FIGS. 2 and 3 so that the lower narrower portion of the glazing panel is now in horizontal alignment with a portion of the aperture which is wider than itself (see detail 12''' in FIG. 3). This glazing panel can now be pivotted inside the cab into the fully open position 12', as indicated by the arrow Q in FIG. 2. When in the fully open position 12' a portion of the glazing panel projects outside the cab to provide a canopy to protect the operator from rain or other bad weather.

A latching arrangement (not shown) is provided for holding the glazing panel in the fully open position 12'. Any tendency for the glazing panel to swing rearwardly, as indicated by arrow R in FIG. 2, during the opening process is controlled by the abuttment of the plastic covering of the wiper motor 16 with the adjacent portion 10' of the cab. This prevents the window contacting any digger or other equipment which may be mounted on the rear of the tractor.

The geometry of the support arms 17 and their points of mounting on brackets 18 and the glazing panel 12 are chosen so that the glazing panel 12 does not excessively intrude into the operator's space with the cab nor foul any controls C for any equipment mounted on the rear of the tractor as the panel is swung between its closed and fully open positions.

FIGS. 4 and 5 show an alternative arrangement in which a glazing panel 40, again of vertically tapering form, is supported in a vertically tapering aperturee 41 by a pair of support arms 42. Each support arm is pivotted at one end on a bracket 43 secured to the cab and at the other end to a bracket 44 secured to a metal frame 45 which extends around the edge of the glazing panel. An arm 46 is connected with each support arm 42 and is acted on by a gas-filled strut 47 which is arranged to act in an over-centre manner about the pivot axis 48 of each support arm.

The actual path travelled by the glazing panel as it moves between its closed and open positions is controlled by a mechanism associated with each support arm. Each mechanism is in the form of a first gear wheel 49 which carries a lever arm 52 which is pivotally connected at 54 with one end of a control arm 50. The other end of the control arm is pivotted at 53 on the cab. A second gear wheel 51 engages the gear wheel 49 and is non-rotatably connected to the associated window bracket 44, so that as the support arms 42 pivot during the opening of the glazing panel the gear wheels 49 and 52 are rotated and the panel 40 is pivotted. The geometry of the support arms 42, the control arms 50 and the gear wheels 49 and 51 are shown diagrammatically in FIG. 6 for clarity. The control arm, support arm, gear lever arm 52 and the cab structure between pivot axes 48 and 53 form a 4-bar linkage. By appropriate choice of the length of the different members of this linkage and the gear ratio between gear wheels 49 and 51 the locus of the glazing panel during movement between its closed and open positions can be set to the desired form so that the panel does not foul the controls C nor any equipment mounted on the rear of the tractor.

By way of illustration of a typical locus for the glazing panel the locus of the inner lower edge of the frame 45 of the glazing panel is shown by dotted detail 60 in FIG. 4. It will be appreciated from FIG. 4 that the frame 45 which surrounds the glazing panel is arranged to seal on to the inside of the fixed glasing panels of the window. Latches (not shown) are again provided to secure the glazing panel in its closed position and also in its open position 40'. A handle 65 is also provided on the lower portion of the glazing panel.

To open the glazing panel the operator, after releasing the latches, pulls on the handle 65 to move the panel inwards to the position 40''. This rotates the support arms 42 clockwise sufficiently to move the line of action of the gas struts over-centre relative to pivot axis 48 so that the struts then apply a clockwise torque to support arms 42 which rotates the support arms towards the position 42' occupied by the arms when the glazing panel is in its open position. The positions of the strut 47 and arm 46 when the panel is in its open position are also shown at 47' and 46' respectively in FIG. 4.

As will be appreciated, the connection via control arms 50 between the cab and gears 49 causes clockwise rotation of gears 49 as the support arms 42 are pivotted upwardly and corresponding counter-clockwise rotation of gears 51 and thus the glazing panel. This causes the lower inward edge of the frame 45 to follow locus 60 so that the glazing panel is raised to its open position with virtually no effort on the part of the operator after the panel has been pulled inwards to position 40".

Again, as in the previous construction, part of the glazing panel is arranged to project rearwardly outside the cab when in its open position to provide protection against rain, etc.

It will be appreciated that, if desired, the locus of the glazing panel may be controlled by a single gear mechanism of the type described above which is associated with one of the support arms only.

Figure 8:
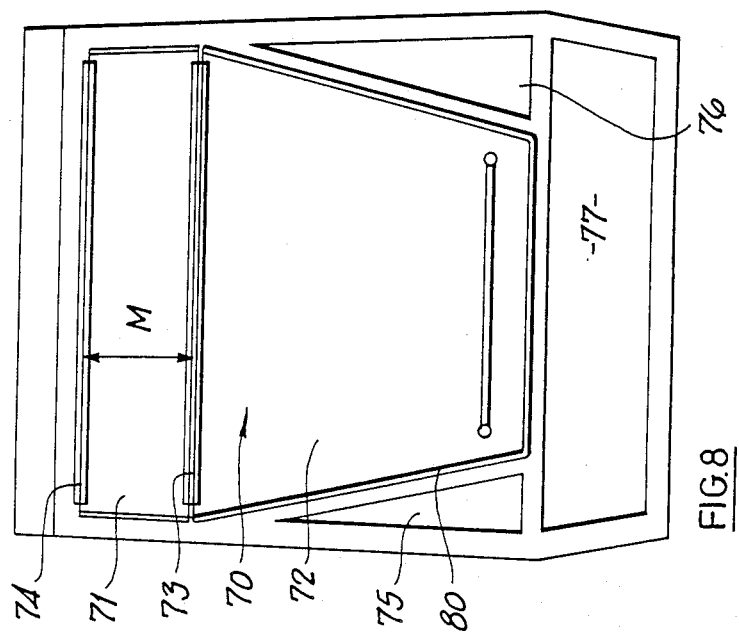
Figure 7:
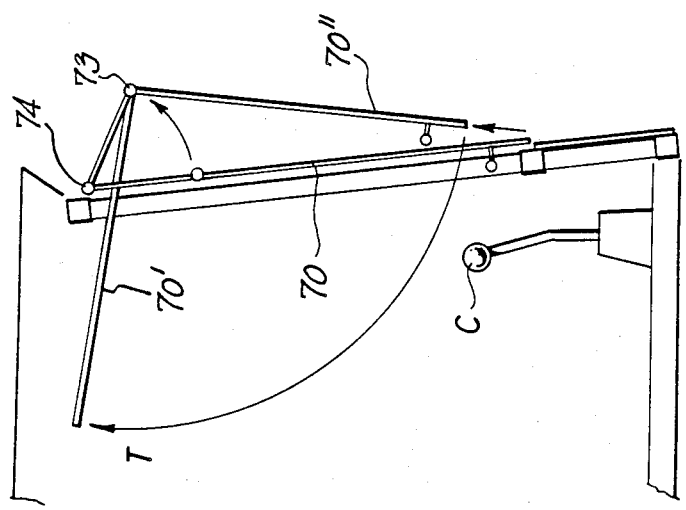

FIGS. 7 and 8 show a further form of the present invention in which a two piece vertically tapering glazing panel 70 has its upper and lower parts 71 and 72 joined by a hinge 73. The upper edge of the upper part 71 is hinged on to the cab at 74. The rear window is completed by fixed glazing panels 75, 76 and 77. The glazing panel 70 is slightly larger than its aperture 80 and is sealed when in its closed position by a seal (not shown) which is carried by those portions of the cab around the aperture. Latches (not shown) are provided to hold the glazing panel in its closed position 70 and its open position 70' shown in FIG. 7.

In order to open the glazing panel the operator, after releasing the latches, raises the panel to an intermediate position, for example the position 70" of FIG. 7, so that the lower narrower portion of the lower part 72 of the panel is in alignment with a portion of the aperture which is wider than itself. The operator can then pivot the lower part 72 of the panel upwards and inwards as shown by arrow T in FIG. 7. Thus the panel will clear the controls C and will not foul any equipment mounted on the rear of the tractor.

As will be appreciated, the depth M of the upper part 71 of the panel determines the extent to which the panel projects rearwardly beyond the cab when the panel is in its open position. By careful choice of the dimensions of parts 71 and 72 and fixed panels 75, 76 ad 77 the level of interference with the operator's view through the rear window caused by the position of the hinge 73 and the frames of panels 75, 76 and 77 can be minimised.

We claim:

1. A vehicle cab having a window aperture closed by a pivotable glazing panel, the window aperture being of vertically tapering form such that the width of the lower regions of the aperture is less than higher regions of the aperture and the glazing panel is of similar vertically tapering form, and glazing panel mounting means which allows the glazing panel to be moved from a generally upright closed position to a generally horizontal open position by raising said panel in a vertical sense so that the lower narrower portion of the panel is in alignment with a portion of the aperture wider than itself and then pivoting the lower narrower portion of the glazing panel about a first generally horizontal axis through the wider portion of the aperture into its generally horizontal open position.

2. A cab according to claim 1 in which the glazing panel mounting means may include a support arm structure which is pivotally mounted on the cab about a second generally horizontal axis, the glazing panel being pivotally mounted on the arm about said first axis.

3. A cab according to claim 2 in which spring means is provided which acts on the support arm structure in an over-centre manner about said second axis to bias the panel towards both its closed and open positions.

4. A cab according to claim 2 in which a mechanism is provided for interlinking the pivotal movement of the support structure and glazing panel to ensure that a predetermined angular relationship is maintained between the cab and the support arm structure and between the support arm structure and the glazing panel as the panel is pivoted between its closed and open positions so that the glazing panel moves between its closed and open positions along a path which does not significantly encroach into the operator's space envelope within the cab.

5. A cab according to claim 4 in which the mechanism comprises a first gear wheel inter-connected with the cab so that pivoting of the support arm structure rotates said first gear wheel, and a second gear wheel which engages said first gear wheel and is connected with the glazing panel to pivot the glazing panel relative to the support arm as the support arm pivots relative to the cab.

6. A cab according to claim 5 in which the inter-connection between the first gear wheel and cab is provided by a control arm which is mounted at the end on the cab and connected at the other end with the first gear wheel via a lever so that the cab, support arm structure, control arm and lever form a four—bar linkage, with the control arm pivoting with the support arm structure to rotate the first gear wheel.

7. A cab according to claim 1 in which the glazing panel is in upper and lower parts which are hinged together by a horizontally extending hinge which constitutes said first pivot axis, the lower part of the panel being of vertically tapering form and the mounting means mounting an upper edge portion of the upper part of the panel on the cab for pivoting about a second generally horizontal axis, thus allowing the lower part of the panel to be vertically raised by pivotting the upper part of the panel upwards and outwards relative to the cab about said second axis and the lower part of the panel to be subsequently pivotted upwards and inwards relative to the upper panel part to pass through the window aperture towards its generally horizontal open position.

8. A cab according to claim 1 in which a portion of the glazing panel is arranged to project outside the cab when the panel is in its open position to provide a canopy to protect the vehicle operator from rain or other bad weather.

9. A cab according to claim 1 in which the glazing panel when in its closed position seals onto the outside of the cab around the aperture.

* * * * *